(12) United States Patent
Strackerjahn et al.

(10) Patent No.: US 8,474,293 B2
(45) Date of Patent: Jul. 2, 2013

(54) BALL AUTOFRETTAGE

(75) Inventors: Henrich Strackerjahn, Gütersloh (DE); Matthias Goken, Gütersloh (DE)

(73) Assignee: Sandvik Materials Technology Deutschland GmbH, Dusseldorf (DE)

( * ) Notice: Subject to any disclaimer, the term of this patent is extended or adjusted under 35 U.S.C. 154(b) by 829 days.

(21) Appl. No.: 12/310,973

(22) PCT Filed: Aug. 24, 2007

(86) PCT No.: PCT/EP2007/058805
§ 371 (c)(1), (2), (4) Date: Oct. 2, 2009

(87) PCT Pub. No.: WO2008/031703
PCT Pub. Date: Mar. 20, 2008

(65) Prior Publication Data
US 2010/0077818 A1   Apr. 1, 2010

(30) Foreign Application Priority Data
Sep. 16, 2006 (DE) .......................... 10 2006 043 590

(51) Int. Cl.
B21D 39/14 (2006.01)
(52) U.S. Cl.
USPC ................ 72/75; 72/58; 72/367.1; 72/370.01

(58) Field of Classification Search
USPC ............ 72/57, 58, 75, 367.1, 370.01, 370.06, 72/370.22–370.24, 453.01, 56, 61; 29/890.044, 29/446; 42/76.1; 89/14.7
See application file for complete search history.

(56) References Cited

U.S. PATENT DOCUMENTS

| | | | |
|---|---|---|---|
| 3,427,843 A | 2/1969 | Green | |
| 3,852,871 A | 12/1974 | Read, Jr. | |
| 4,005,591 A * | 2/1977 | Werner | 72/75 |
| 7,210,209 B2 * | 5/2007 | Dvoskin et al. | 29/407.08 |
| 7,818,986 B1 * | 10/2010 | Parker et al. | 72/58 |

FOREIGN PATENT DOCUMENTS

| | | |
|---|---|---|
| DE | 1 583 992 | 6/1971 |
| DE | 197 57 962 | 7/1999 |
| DE | 102 15 554 | 10/2003 |
| JP | 60-040624 | 3/1985 |
| JP | 60-210332 | 10/1985 |
| JP | 2003-277826 | 10/2003 |

* cited by examiner

*Primary Examiner* — Debra Sullivan
(74) *Attorney, Agent, or Firm* — Morgan, Lewis & Bockius LLP

(57) ABSTRACT

The invention relates to a method of increasing the dynamic pressure resistance of a metal component with a tubular inner space, in which a hard metal ball is forced under high pressure through the interior of the tubular inner space, wherein the hard metal ball has a diameter that is greater than the inside diameter of the tubular inner space before the hard metal ball is forced through.

17 Claims, 2 Drawing Sheets

BALL AUTOFRETTAGE

The invention concerns a method of increasing the dynamic pressure resistance or alternating bending strength of a metallic component with a tubular internal space, in particular metallic tube components, fittings and other pressure-carrying components. The invention further concerns components produced in accordance with that method.

BACKGROUND OF THE INVENTION

Pressure-carrying pipes and other components are used in many technical areas such as for example in high-pressure technology and in the chemical industry. A distinction is drawn between a static pressure loading (remaining the same) and a dynamic pressure loading (alternating or pulsating). In many uses pressure-carrying components are frequently exposed to an alternating or pulsating pressure loading which, depending on the loading level, leads to more or less rapid failure of the component. Influencing values in respect of the loading are for example the pressure collective, the frequency of the pressure reversal alternations and the pressure delta (difference between maximum and minimum pressures). Dynamic pressure resistance or service life of individual components is in that case far below that which such a pipe or tube or component would reach with a static pressure loading.

Static pressure resistance of components depends inter alia on the mechanical properties of the material such as yield strength ($Rp_{0.2}$) and tensile strength ($R_m$). Dynamic pressure resistance is determined by further parameters such as for example ductility (elongation to fracture A) of the material, the depth of incipient cracks in the tube wall, the degree of purity and the microstructure.

The failure of tubes and other components because of dynamic loading occurs due to critical crack growth, for example from the inside surface of the tube to the outside surface thereof. In that case cracks can occur due to local stress concentrations, for example at intermetallic inclusions, or incipient cracks which already exist are further propagated. The service life of a tube or another component under dynamic loading thus depends inter alia on the magnitude of the crack growth per pressure shock and the material thickness.

To increase the dynamic service life of components in a given loading collective, the above-mentioned influencing factors are optimised in production of the material and/or methods are used for subsequently improving certain material properties, such as for example autofrettage.

Autofrettage denotes a method of increasing the fatigue strength of components in high-pressure technology. In that case pipes or tubes and other components are loaded once and only for a few seconds to approximately 80% of their calculated bursting pressure, that is to say far above the calculated static operating pressure. Under that loading microplastic flow in the material occurs above the yield strength or elastic limit of the material and residual compressive stresses are produced in the substance of the material. When the component is relieved of load those residual stresses remain in the material and prevent or reduce the growth of incipient microcracks. As autofrettage only immaterially influences the mechanical properties of the autofretted material it thus has scarcely any influence on the static pressure resistance of the tube or component, but rather on dynamic pressure resistance.

A disadvantage of autofrettage is that this method is limited in respect of the required pressures and the static pressure load-bearing capability of the components to be autofretted. In some cases or for certain materials pressures of over 15,000 bars, for example pressures of between 18,000 and 22,000 bars, would have to be produced, by calculation, to achieve satisfactory results in the components, and that can only be implemented at the cost of extreme complication and expenditure in terms of installation technology, or at the present time cannot be implemented at all. Furthermore the level of the residual compressive stresses which can be locally produced is limited because the autofrettage pressure cannot be increased just as desired as otherwise the component would burst. The autofrettage method is thus technically limited, it cannot provide the pressures required on the basis of calculation at all for many materials and it is also highly cost-intensive and demanding.

OBJECT OF THE INVENTION

There is therefore a need for a method of increasing the dynamic pressure resistance or improving the service life of components for high-pressure uses, in which the known disadvantages and limitations of autofrettage in accordance with the state of the art are overcome.

BRIEF DESCRIPTION OF THE DRAWING FIGURES

DESCRIPTION OF THE INVENTION

Figure 1:
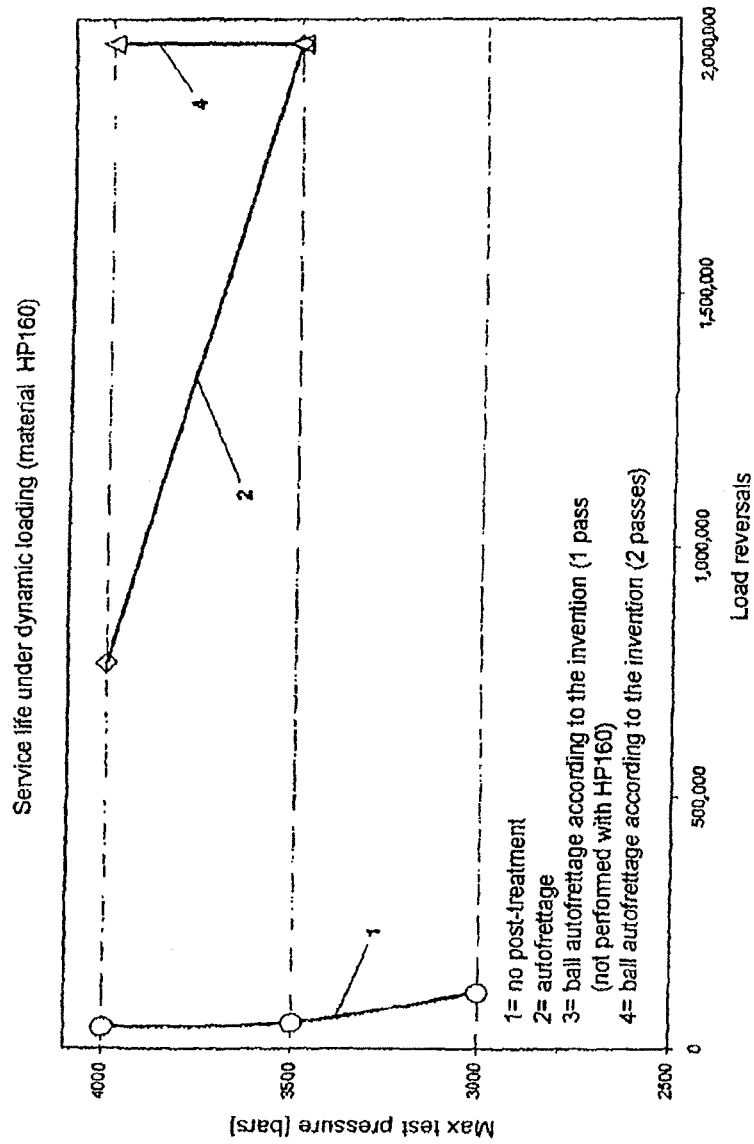
FIG. 1 shows the results of the test for dynamic pressure resistance for the material HP160.

That object is attained by a method of increasing the dynamic pressure resistance of a metallic component with a tubular internal space, in which a hard metal ball is forced under high pressure through the interior of the tubular internal space, wherein the hard metal ball is of a diameter larger than the inside diameter of the tubular internal space before the hard metal ball is forced therethrough.

The method according to the invention has a series of advantages over the autofrettage used for that purpose:

a) The required pressures for moving the hard metal ball through the interior of the tubular internal space are far below the pressures to be applied in the autofrettage method. That has advantages in terms of installation technology, it saves on considerable costs for equipment for producing extremely high pressures and the pressures do not need to go to close to the load limit of the metal, as is the case with autofrettage.

b) In the method according to the invention incipient surface cracks which are present at the inside wall of the tubular internal space are partially or completely removed, whereby the risk of crack formation and crack propagation in high-pressure operation is considerably reduced.

c) The residual compressive stresses produced in the material by the method according to the invention have the same or better positive effect than the autofrettage method.

d) In addition the method according to the invention provides for correcting fluctuations in the inside diameter of the tubular internal space of the component, which can occur in manufacture.

e) Furthermore the inside wall of the tubular internal space is smoothed by the method according to the invention so that the surface roughness of the inside wall considerably decreases, which is advantageous in many uses for the flow properties within the component.

f) The components processed by the method according to the invention have a markedly higher level of dynamic pressure resistance in comparison with autofretted components.

Metallic components with a tubular internal space in accordance with the invention include all components of a pressure-carrying system insofar as they have tubular internal spaces. They are preferably pipes or tubes for carrying liquids or gases but also fittings, connecting portions, T-pieces, tube cross-fittings, valves, valve seats and other components.

Different metallic materials are used for the production of pipes or tubes and other components in high-pressure technology. These primarily involve non-alloyed, low-alloyed and high-alloyed steels. Particularly high dynamic pressure resistance is achieved in the case of tubes or other components of high-alloyed steel which was cold work-hardened or age hardened and then treated in accordance with the method of the invention, as the examples described hereinafter show.

In a preferred embodiment of the invention the pressure with which the hard metal ball is forced through the tubular internal space of the component is in the range of between 2000 and 7000 bars, preferably in the range of between 3000 and 6000 bars and particularly preferably in the range of between 3500 and 5500 bars. The use of a pressure of less than 2000 bars has the result that the ball moves irregularly through the tubular internal space of the component or remains stuck therein.

In a further preferred embodiment of the invention the pressure with which the hard metal ball is forced through the tubular internal space of the component is produced by means of a liquid under pressure, preferably by means of an oil under pressure. A distinction is drawn between a 'starting pressure' required to overcome frictional and other resistances and cause the hard metal ball to move from the rest position in the tubular internal space of the component, and a 'movement pressure' required to keep the hard metal ball moving after the initial start in the tubular internal space of the component. The starting pressure is always considerably higher than the movement pressure. Both pressures depend on various parameters, in particular the mechanical strength of the material and the difference between the outside diameter of the hard metal ball and the inside diameter of the tubular internal space of the component.

In spite of the considerable force required to press the hard metal ball of larger diameter than the inside diameter of the tubular internal space of the component through the component, the pressure required in the method according to the invention is considerably lower than with the known autofrettage operation to achieve identical or better results in terms of dynamic pressure resistance.

In a further advantageous configuration of the invention the diameter of the hard metal ball is larger by between 1 and 5%, preferably by between 1.5 and 4%, particularly preferably by between 2 and 3%, than the inside diameter of the tubular internal space of the component before the hard metal ball is forced therethrough. The result of an excessively large ball diameter is that the ball does not move or remains stuck in the tubular internal space of the component. If the diameter is excessively small excessively low residual compressive stresses are introduced into the material.

In a further embodiment of the method according to the invention hard metal balls are moved under high pressure through the tubular internal space of the component a plurality of times in succession, preferably between two and four times in succession, particularly preferably twice in succession, wherein the hard metal balls are of increasing diameters in the sequence in which they are successively forced under high pressure through the tubular internal space of the component.

In that way the inside surface of the component can be worked in a plurality of stages. After a first hard metal ball has been forced through the interior of the component the inside diameter of the tubular internal space of the component is enlarged, wherein the inside surface already experiences the described improvement in material properties. Then a further hard metal ball of a larger diameter is forced through the interior of the component to achieve a further improvement in the material properties, the inside surface of the component and the dynamic pressure resistance resulting from the method. In that way two, three, four or more hard metal balls of increasing diameter can be successively forced through the interior of the tubular internal space of the component to increasingly improve the desired properties. It has proven to be particularly advantageous and adequate to achieve excellent results if the operation is repeated precisely twice, that is to say precisely two metal balls of increasing outside diameter are successively forced through a component. The number of repetitions and the choice of the respective diameters as well as the pressures to be applied by the hard metal balls are however dependent on the material and the respective dimensions of the tubular internal space of the component. The appropriate parameters for production of components for given dynamic pressure loadings can be determined by a few experiments and by producing Wöhler curves. Wöhler curves are known to the man skilled in this art and serve for him to select the appropriate components, materials and working parameters for predetermined uses.

The term 'hard metal ball' in accordance with the present invention denotes a ball of a material harder than the material of the component to be worked so that, when the hard metal ball is forced through the interior of the tubular internal space of the component, it is not the hard metal ball that is deformed but the material of the component. The term 'hard metal' in this context is not limited to sintered carbides in the classical sense but includes all materials which are harder than the material of the component to be worked. Particularly preferably however the hard metal ball comprises WC sintered carbide or SiC sintered carbide. Hard metal balls of cold working steels are however also suitable, such as for example those bearing the material numbers 1.2002, 1.2067 or 1.4021 in accordance with DIN EN 10027-1+2 or DIN 17007.

EXAMPLES

Tubes of two different high-alloyed steels with an austenitic structure were tested for carrying out the method according to the invention:

(1) Sandvik TP316L (=material No 1.4404=X2CrNiMo17-12-3; Sandvik P&P, Werther, Germany)

(2) Sandvik HP160

(no material number given; Sandvik P&P, Werther, Germany).

The samples of the two materials were each of a length of about 220 mm, an inside diameter of 4.7 mm and an outside diameter of 14.3 mm. The samples were each present in the cold-worked condition. The guide analyses of the materials are set out in Table 1.

TABLE 1

Guide analyses of the materials TP316L and HP160:

| Material | C max | Si max | Mn max | P max | S max | Cr | Mo | Ni | Nb | N | Cu max | Fe |
|---|---|---|---|---|---|---|---|---|---|---|---|---|
| HP160 | 0.06 | 0.60 | 4.25 | 0.025 | 0.003 | 19.5 to 22.0 | 2.0 to 3.0 | 9.0 to 11.0 | 0.25 to 0.8 | 0.25 to 0.50 | 0.20 | Balance |
| TP316L | 0.03 | 1.00 | 2.00 | 0.04 | 0.015 | 16.50 to 18.50 | 2.00 to 2.50 | 10.00 to 14.00 | — | <0.11 | — | Balance |

After hot manufacture (smelting, billet production, extrusion) the tubes were subjected to a treatment using cold pilger mills with a reduction in cross-section of 60-90%, solution annealing at 1120° C. and cold drawing with a reduction in cross-section of 10-20% (HP160) and 30-40% (TP316L). The mechanical benchmarks of the products cold-worked in that way are set out in Table 2.

TABLE 2

Mechanical benchmarks for TP316L and HP160:

| Material | Yield strength $R_{p0.2}$ [MPa] | Tensile strength $R_m$ [MPa] | Elongation to fracture A [%] |
|---|---|---|---|
| HP160 | >1100 | >1200 | >12 |
| TP316L | >600 | >700 | >16 |

The samples were then respectively subjected to one of the post-treatments 1 through 4 set out hereinafter and tested in respect of their dynamic pressure resistance.

Post-Treatments of the Cold-Worked Samples:
1 no post-treatment
2 autofrettage:

| | |
|---|---|
| autofrettage pressure: | HP160: 12000 bars |
| | TP316L: 6000 bars |
| holding time: | 5 min |
| medium: | hydraulic oil |

3 ball autofrettage according to the invention (one pass)

| | |
|---|---|
| ball material: | tungsten carbide |
| ball diameter: | 4.76 mm |
| medium: | hydraulic oil |
| pressure: | HT160: 5000/3200 bars |
| | TP316L: 5000/3200 bars |
| | (starting pressure/movement pressure) |

4 ball autofrettage according to the invention (two passes)

| | |
|---|---|
| ball material: | tungsten carbide |
| medium: | hydraulic oil |
| 1st pass as (c) | |
| 2nd pass: | |
| ball diameter: | 4.79 mm |
| pressure: | HP160: 7000/5000 bars |
| | TP316L: 5000/4000 bars |
| | (starting pressure/movement pressure) |

In the test in respect of dynamic pressure resistance the sample tubes were subjected to load reversals under oil pressure between a maximum pressure (Pmax) and a minimum pressure (Pmin) with a load reversal frequency of 6 Hz. Pmin was 200 bars in each case. Pmax was set at 3000 bars, 3500 bars or 4000 bars for various samples.

Figure 2:
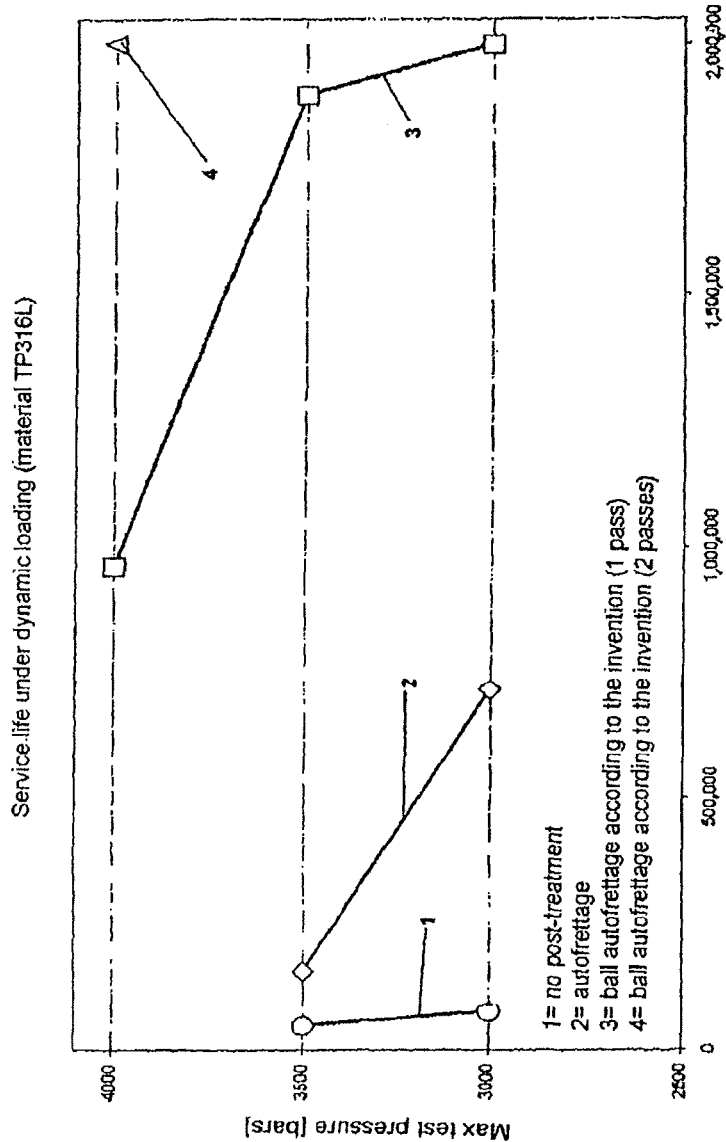
FIG. 2 shows the results of the test for dynamic pressure resistance for the material TP316L.

The results of the test for dynamic pressure resistance are shown in FIG. 1 for the material HP160 and in FIG. 2 for the material TP316L. The respective maximum pressure to which a sample was subjected is plotted on the ordinate. The load reversals up to fracture or bursting of a sample are respectively plotted on the abscissa. A sample was classified as 'rated for endurance strength' if it withstood 2 millions load reversals between Pmin and Pmax undamaged. The test was then interrupted for that sample after 2 millions of load reversals.

The samples which were only cold-worked (without post-treatment 1) HP160 and TP316L already failed after a few thousand load reversals at a Pmax of 3000, 3500 and 4000 bars.

It was not possible to substantially increase the dynamic pressure resistance of the sample of the material TP316L at a Pmax of 3500 bars by conventional autofrettage (post-treatment 2). That conventionally autofretted material reached a service life of the order of magnitude of about 700,000 load reversals only at a Pmax of only 3000 bars. With the same post-treatment the material HP160, at a Pmax of 4000 bars, reached a service life of about 750,000 load reversals and was rated for endurance strength with a service life of over 2 millions of load reversals only with a Pmax of 3500 bars.

The dynamic pressure resistance of the samples of both materials could be considerably increased by the method according to the invention. With just one pass in respect of the ball autofrettage according to the invention (post-treatment 3) the sample of the material TP316L, at a Pmax of 3500 bars, reached a service life of the order of magnitude of about 1.9 millions of load reversals and with a Pmax of 3000 bars was rated for endurance strength at over 2 millions of load reversals (post-treatment 3 not tested for material HP160). When using 2 passes of the ball autofrettage according to the invention (post-treatment 4) the samples of both materials were already rated for endurance strength at a Pmax of 4000 bars.

The results show that the method according to the invention provides once again a marked increase in dynamic pressure resistance over conventional autofrettage.

The invention claimed is:

1. A method of increasing the dynamic pressure resistance of a metallic component with a tubular internal space, in which a hard metal ball is forced under high pressure in the range of between 2000 and 7000 bars through the interior of the tubular internal space, wherein the hard metal ball is of a diameter larger than the inside diameter of the tubular internal space before the hard metal ball is forced therethrough.

2. A method as set forth in claim 1, wherein the pressure with which the hard metal ball is forced through the tubular internal space of the component is produced by means of a liquid under pressure.

3. A method as set forth in claim 2, wherein the liquid is an oil.

4. A method as set forth in claim 1, wherein the diameter of the hard metal ball is larger by between 1 and 5% than the inside diameter of the tubular internal space of the component before the hard metal ball is forced therethrough.

5. A method as set forth in claim 4, wherein the diameter of the hard metal ball is larger by between 1.5 and 4%.

6. A method as set forth in claim 5, wherein the diameter of the hard metal ball is larger by between 2 and 3%.

7. A method as set forth in claim 1, wherein a plurality of hard metal balls are moved under high pressure through the tubular internal space of the component a plurality of times in succession, wherein each of the hard metal balls is of increasing diameter in the sequence in which they are successively forced under high pressure through the tubular internal space of the component.

8. A method as set forth in claim 7, wherein the plurality of hard metal balls are moved under high pressure through the tubular internal space of the component between two and four times in succession.

9. A method as set forth in claim 8, wherein the plurality of hard metal balls are moved under high pressure through the tubular internal space of the component twice in succession.

10. A method as set forth in claim 7, wherein the metallic component is solution-annealed prior to the plurality of hard metal balls being forced therethrough.

11. A method as set forth in claim 7, wherein the metallic component is subjected to cold work-hardening or age hardening prior to the plurality of hard metal balls being forced therethrough.

12. A method as set forth in claim 1, wherein the metallic component is produced from an unalloyed, low-alloyed or high-alloyed steel.

13. A method as set forth in claim 12, wherein the metallic component is produced from a high-alloyed steel.

14. A method as set forth in claim 1, wherein the metallic component is solution-annealed prior to the hard metal ball being forced therethrough.

15. A method as set forth in claim 1, wherein the metallic component is subjected to cold work-hardening or age hardening prior to the hard metal ball being forced therethrough.

16. A method as set forth in claim 1, wherein the pressure with which the hard metal ball is forced through the tubular internal space of the component is in the range of between 3000 and 6000 bars.

17. A method as set forth in claim 16, wherein the pressure with which the hard metal ball is forced through the tubular internal space of the component is in the range of between 3500 and 5500 bars.

* * * * *